(12) United States Patent
Shen et al.

(10) Patent No.: US 9,131,507 B2
(45) Date of Patent: Sep. 8, 2015

(54) METHOD AND APPARATUS FOR RECEIVING SIGNALS

(75) Inventors: Zukang Shen, Haidian District Beijing (CN); Yanan Lin, Haidian District Beijing (CN); Xuejuan Gao, Haidian District Beijing (CN); Xueming Pan, Haidian District Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 0 days.

(21) Appl. No.: 13/704,238

(22) PCT Filed: May 25, 2011

(86) PCT No.: PCT/CN2011/074657
§ 371 (c)(1),
(2), (4) Date: Feb. 27, 2013

(87) PCT Pub. No.: WO2011/147315
PCT Pub. Date: Dec. 1, 2011

(65) Prior Publication Data
US 2013/0208611 A1 Aug. 15, 2013

(30) Foreign Application Priority Data
May 25, 2010 (CN) .......................... 2010 1 0189990

(51) Int. Cl.
*H04L 12/26* (2006.01)
*H04W 76/04* (2009.01)
(Continued)

(52) U.S. Cl.
CPC ........... *H04W 76/048* (2013.01); *H04B 7/0639* (2013.01); *H04L 1/1861* (2013.01); *H04L 27/2636* (2013.01); *H04L 27/18* (2013.01)

(58) Field of Classification Search
CPC ............ H04W 76/048; H04L 27/2636; H04L 1/1861; H04B 7/0639
USPC ........................................................ 370/252
See application file for complete search history.

(56) References Cited

U.S. PATENT DOCUMENTS

2007/0036104 A1 * 2/2007 Bachl et al. ................... 370/329

FOREIGN PATENT DOCUMENTS

| CN | 1767514 A | 5/2006 |
|---|---|---|
| CN | 101442361 A | 5/2009 |

(Continued)

OTHER PUBLICATIONS

ISR for related PCT/CN2011/074657 mailed on Aug. 18, 2011.
(Continued)

*Primary Examiner* — Sai-Ming Chan
(74) *Attorney, Agent, or Firm* — Ladas & Parry, LLP

(57) ABSTRACT

The present invention discloses a method and apparatus for receiving signals, which comprises the followings: receive signals on at least one receiving branch, which comprises at least two reception units, including one data reception unit and one pilot reception unit at least. Said signal refers to a codeword in a transmission codebook; calculate metric value of each codeword in said transmission codebook according to said received signal; obtain the codeword with maximal metric value among all said codewords and the metric value corresponding to this codeword; if this value exceeds threshold value, Determining the codeword corresponding to said maximal metric value; if this value is less than the threshold value, Determining discontinuously-sent DTX. In the present invention, perform joint demodulation of data symbol and pilot symbol to make the demodulation results more reliable; meanwhile; judge whether it is discontinuous transmission based on joint demodulation of data symbol and pilot symbol.

10 Claims, 2 Drawing Sheets

(51) Int. Cl.
*H04B 7/06* (2006.01)
*H04L 27/26* (2006.01)
*H04L 1/18* (2006.01)
*H04L 27/18* (2006.01)

(56) References Cited

FOREIGN PATENT DOCUMENTS

| | | |
|---|---|---|
| CN | 101529772 A | 9/2009 |
| EP | 2187546 | 5/2010 |
| JP | 2006-262357 | 9/2006 |
| JP | 2006-295912 | 10/2006 |
| JP | 2009-136714 | 6/2009 |
| JP | 2010-504065 | 2/2010 |
| JP | 2011-514735 | 5/2011 |
| JP | 2012-521937 | 9/2012 |
| JP | 2013-511244 | 3/2013 |
| KR | 10-2008-0035528 | 4/2008 |
| KR | 10-2009-0042987 | 5/2009 |
| WO | 2006/069269 A1 | 6/2006 |
| WO | 2008/039303 | 4/2008 |
| WO | 2009/028095 | 3/2009 |

OTHER PUBLICATIONS

WO for related PCT/CN2011/074657 completed on Aug. 9, 2011.
Office Action for related Chinese patent application 201010189990 dated May 6, 2013 and its English translation.
Office Action for related Japanese patent application 2013-511524 dated Oct. 22, 2013 and its English translation.
Office Action for related Korean patent application Oct. 2012-7023365 dated Oct. 30, 2013 and its English translation.

* cited by examiner

METHOD AND APPARATUS FOR RECEIVING SIGNALS

CROSS REFERENCE TO RELATED APPLICATIONS

This application is the U.S. national stage of international patent application PCT/CN2011/074657 filed on May 25, 2011, which claims priority to Chinese patent application no. 201010189990.X entitled "Method and Apparatus for Receiving Signals" filed in the patent office of the People's Republic of China on May 25, 2010, the disclosures of which are incorporated by reference herein in their entireties.

FIELD OF THE INVENTION

The present invention relates to the field of communication technology, in particular to the method and apparatus for receiving signals.

BACKGROUND OF THE INVENTION

In 3GPP (3rd Generation Partnership Project) LTE (Long Term Evolution) normal CP (Cyclic Prefix), a slot includes 7 SC-FDMA (Single Carrier Frequency Division Multiple Access) symbols. Transmission mode of ACK/NAK (Acknowledge Character/Negative Acknowledge) is shown in FIG. 1. Herein, [S0, S1, . . . , S6] refers to 7 SC-FDMA symbols of a slot. d refers to ACK/NAK symbol to be transmitted. If there is 1 ACK/NAK bit, d refers to a constellation point of BPSK (Binary Phase Shift Keying). If there are 2 ACK/NAK bits, d refers to a constellation point of QPSK (Quadrature Phase Shift Keying). SC-FDMA symbol [S0, S1, S5, S6] is used for transmitting ACK/NAK d (data). Wd=[Wd(0) Wd(1) Wd(2) Wd(3)] refers to OC (Orthogonal Cover) of ACK/NAK data. In LTE, the value of Wd can be OCd0=[1 1 1 1]; or OCd1=[1 −1 1 −1]; or OCd2=[1−1−1 1]. r refers to pilot signal and is equal to 1. SC-FDMA symbol [S2, S3, S4] is used for transmitting r (pilot frequency). Wr=[Wr(0) Wr(1) Wr(2)] refers to spread spectrum code of pilot frequency.

In 3GPP LTE extended CP, a slot includes 6 SC-FDMA symbols. Transmission mode of ACK/NAK is shown in FIG. 2. Herein, [S0, S1, . . . , S5] refers to 6 SC-FDMA symbols of a slot. d refers to ACK/NAK symbol to be transmitted. If there is 1 ACK/NAK bit, d refers to a constellation point of BPSK. If there are 2 ACK/NAK bits, d refers to a constellation point of QPSK. SC-FDMA symbol [S0, S1, S4, S5] is used for transmitting ACK/NAK d (data). Wd=[Wd(0) Wd(1) Wd(2) Wd(3)] refers to OC of ACK/NAK data. In LTE, the value of Wd can be OCd0=[1 1 1 1]; or OCd2=[1−1−1 1]. r refers to pilot signal and is equal to 1. SC-FDMA symbol [S2, S3] is used for transmitting r (pilot frequency). Wr=[Wr(0) Wr(1) Wr(2)] refers to spread spectrum code of pilot frequency. In LTE, the value of Wr can be OCr0=[1 1]; or OCr2=[1−1]. A subframe is comprised of 2 slots and ACK/NAK is transmitted repeatedly on 2 slots of a subframe as shown in FIG. 2.

In 3GPP LTE, a RB (Resource Block) is comprised of 12 REs (Resource Element) and each RE is 15 kHz in terms of frequency domain. For ACK/NAK transmission, a sequence with length of 12 is transmitted on a RB of a SC-FDMA symbol. 12 sequences generated through different CSs (Cyclic Shift) of this sequence are mutually orthogonal. Therefore, an ACK/NAK channel on a RB is determined by a CS and an OC.

Mapping from ACK/NAK channel n to (CS, OC) in a RB under normal CP for the data and pilot frequency of ACK/NAK respectively is shown in Table 1 and 2. $\Delta_{PUCCH}$ refers to the CS spacing used in the same OC. In Table 1 and 2, $\Delta_{PUCCH}$ is equal to 2. The number (n) of ACK/NAK channel can be either acquired from a higher layer signalling or from CCE index (Control Channel Element index) of PDCCH (Physical Downlink Control Channel).

TABLE 1

Mapping from ACK/NAK Channel n to (CS, OC), data, $\Delta_{PUCCH}$ = 2, normal CP

| CS | OCd0 = [1 1 1 1] | OCd1 = [1 −1 1 −1] | OCd2 = [1 −1 −1 1] |
|---|---|---|---|
| 0 | n = 0 | | n = 12 |
| 1 | | n = 6 | |
| 2 | n = 1 | | n = 13 |
| 3 | | n = 7 | |
| 4 | n = 2 | | n = 14 |
| 5 | | n = 8 | |
| 6 | n = 3 | | n = 15 |
| 7 | | n = 9 | |
| 8 | n = 4 | | n = 16 |
| 9 | | n = 10 | |
| 10 | n = 5 | | n = 17 |
| 11 | | n = 11 | |

TABLE 2

Mapping from ACK/NAK Channel n to (CS, OC), pilot frequency, $\Delta_{PUCCH}$ = 2, normal CP

| CS | OCr0 = [1 1 1] | OCr1 = [1 $e^{j2\pi/3}$ $e^{j4\pi/3}$] | OCr2 = [1 $e^{j4\pi/3}$ $e^{j2\pi/3}$] |
|---|---|---|---|
| 0 | n = 0 | | n = 12 |
| 1 | | n = 6 | |
| 2 | n = 1 | | n = 13 |
| 3 | | n = 7 | |
| 4 | n = 2 | | n = 14 |
| 5 | | n = 8 | |
| 6 | n = 3 | | n = 15 |
| 7 | | n = 9 | |
| 8 | n = 4 | | n = 16 |
| 9 | | n = 10 | |
| 10 | n = 5 | | n = 17 |
| 11 | | n = 11 | |

Mapping from ACK/NAK channel n to (CS, OC) in a RB under extended CP for the data and pilot frequency of ACK/NAK respectively is shown in Table 3 and 4. $\Delta_{PUCCH}$ refers to the CS spacing used in the same OC. In Table 3 and 4, $\Delta_{PUCCH}$ is equal to 2. The number (n) of ACK/NAK channel can be either acquired from a higher layer signalling or from CCE index (Control Channel Element index) of PDCCH (Physical Downlink Control Channel).

TABLE 3

Mapping from ACK/NAK Channel n to (CS, OC), data, $\Delta_{PUCCH}$ = 2, extended CP

| CS | OCd0 = [1 1 1 1] | OCd2 = [1 −1 −1 1] |
|---|---|---|
| 0 | n = 0 | |
| 1 | | n = 6 |
| 2 | N = 1 | |
| 3 | | n = 7 |
| 4 | N = 2 | |
| 5 | | n = 8 |
| 6 | N = 3 | |
| 7 | | n = 9 |
| 8 | N = 4 | |
| 9 | | n = 10 |

TABLE 3-continued

Mapping from ACK/NAK Channel n to (CS, OC), data, $\Delta PUCCH = 2$, extended CP

| CS | OCd0 = [1 1 1 1] | OCd2 = [1 −1 −1 1] |
|---|---|---|
| 10 | N = 5 | |
| 11 | | n = 11 |

TABLE 4

Mapping from ACK/NAK Channel n to (CS, OC), pilot frequency, $\Delta PUCCH = 2$, extended CP

| CS | OCr0 = [1 1] | OCr1 = [1 −1] |
|---|---|---|
| 0 | n = 0 | |
| 1 | | n = 6 |
| 2 | n = 1 | |
| 3 | | n = 7 |
| 4 | n = 2 | |
| 5 | | n = 8 |
| 6 | n = 3 | |
| 7 | | n = 9 |
| 8 | n = 4 | |
| 9 | | n = 10 |
| 10 | n = 5 | |
| 11 | | n = 11 |

For the present ACK/NAK transmission mode, commonly-used demodulation algorithm can be adopted, which means that channel is estimated firstly according to pilot symbol, and then demodulation result is acquired according to demodulation data symbol acquired during signal estimation. Signal estimation and data demodulation are realized by steps in the above demodulation algorithm with pilot symbol operation as the first step and data symbol operation as the second step. Therefore, it fails to make full use of the correlation between pilot symbol and data symbol, thus gaining poor demodulation performance.

SUMMARY OF THE INVENTION

The embodiments of the present invention provide the method and apparatus for receiving signals to realize joint demodulation of data and pilot symbol and judge whether it is discontinuous transmission (DTX) at the same time.

The embodiments of the present invention provide one method for receiving signal, including:

Receive signals on at least one receiving branch, which includes at least two reception units, including one data reception unit and one pilot reception unit at least. Said signal refers to a codeword in a transmission codebook;

Calculate metric value of each codeword of said transmission codebook according to said received signal and obtaining the maximal metric value;

Determining the codeword corresponding to said maximal metric value if this value exceeds threshold value;

Determining discontinuously-sent DTX if said maximal metric value is less than threshold value.

The embodiments of the present invention provide the apparatus for receiving signals, including:

Receiving module, which is used to receive signals on at least one receiving branch, which includes at least two reception units, including one data reception unit and one pilot reception unit at least. Said signal refers to a codeword in a transmission codebook;

Calculation module, which is used to calculate metric value of each codeword of said transmission codebook according to said received signal and obtaining the maximal metric value;

Demodulation module, which is used when Determining the codeword corresponding to said maximal metric value if this value exceeds threshold value; when it refers to discontinuously-sent DTX if such maximal metric value is less than threshold value.

Compared with the present technology, the embodiments of the present invention at least possess the following advantages:

In the embodiments of the present invention, perform joint demodulation of data symbol and pilot symbol to make the demodulation results more reliable; meanwhile, judge whether it is discontinuous transmission (DTX) based on joint demodulation of data symbol and pilot symbol.

BRIEF DESCRIPTION OF THE DRAWINGS

To more clearly explain the technical proposal in the embodiments of the present invention or present technology, attached drawings required by the embodiments of the present invention or present technology description shall be simply introduced below. Obviously, drawings described below are only some embodiments of the present invention, and for ordinary technicians of this field, they can also acquire other attached drawings based on these drawings on the premise of paying no creative work.

DETAILED DESCRIPTION OF THE EMBODIMENTS OF THE PRESENT INVENTION

Then we will combine the attached drawings in the embodiments of the present invention to clearly and completely describe the technical proposals therein. Obviously, the embodiments described below are only a part of them instead of the whole. Based on the embodiments of the present invention, other embodiments obtained by ordinary technicians of this field on the premise of paying no creative work all belong to the protected scope of the embodiments of the present invention.

Embodiment I

Figure 1:
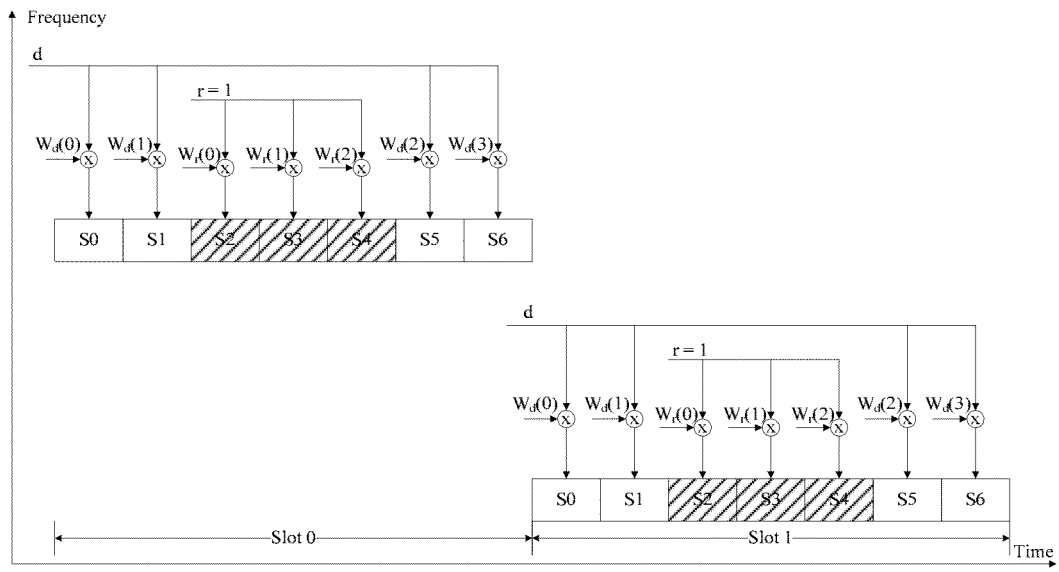
FIG. 1 is a diagram of ACK/NAK transmission mode in 3GPP LTE Normal CP in the present technology.
Figure 2:
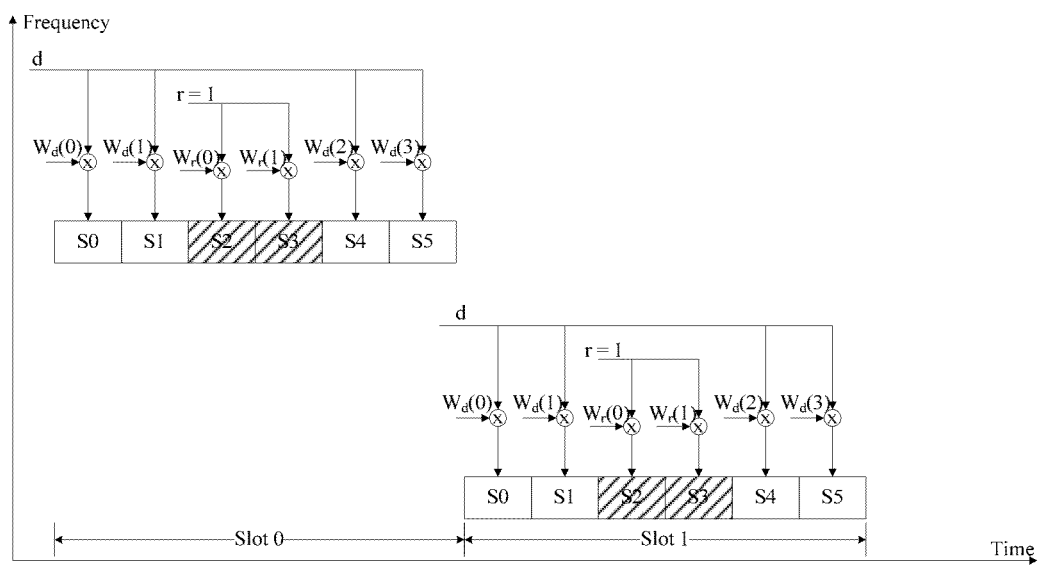
FIG. 2 is a diagram of ACK/NAK transmission mode in 3GPP LTE extended CP in the present technology.
Figure 3:
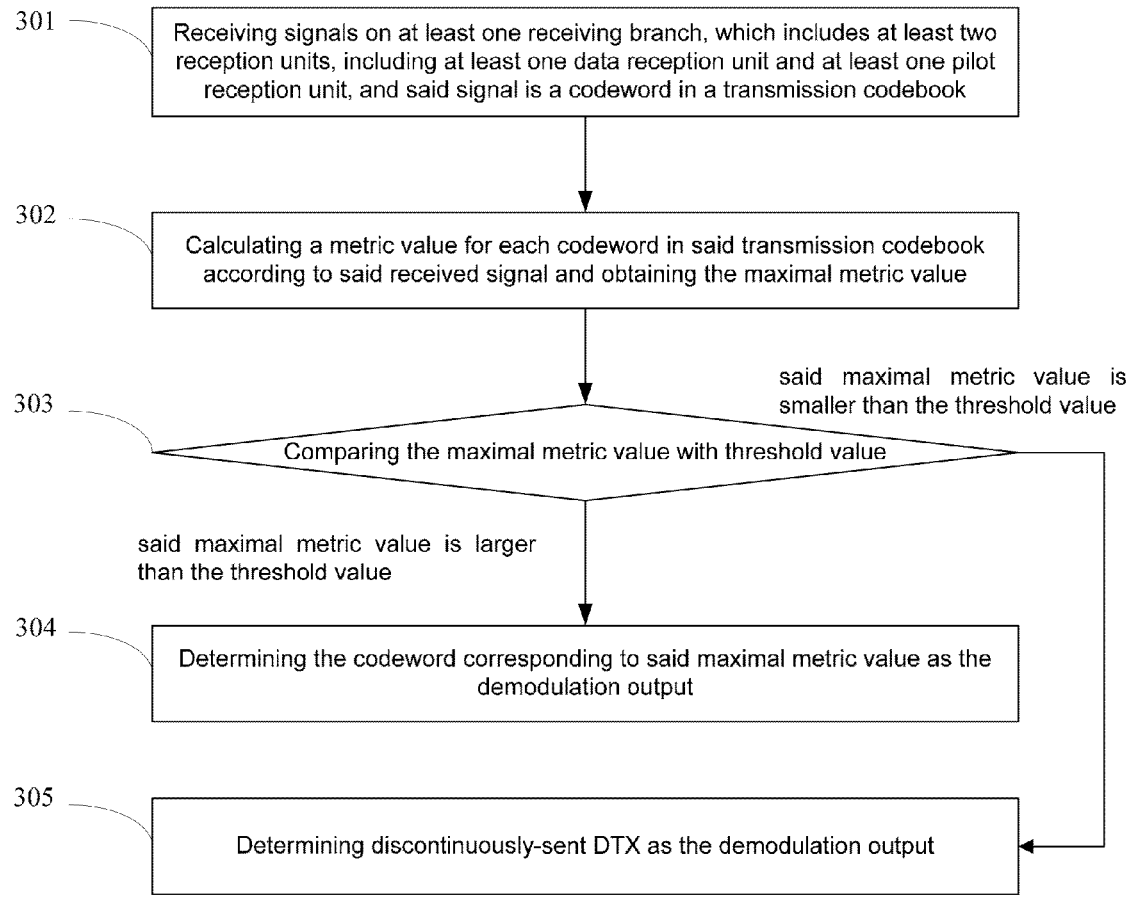
FIG. 3 is a flow diagram of the method for receiving signals provided by Embodiment I of the present invention.

Embodiment I of the present invention provides a method for receiving signals as shown in FIG. 3, including:

Step 301: Receiving signals on at least one receiving branch, which includes at least two reception units, including at least one data reception unit and at least one pilot reception unit, and said signal is a codeword in a transmission codebook;

Step 302: Calculating a metric value for each codeword in said transmission codebook according to said received signal and obtaining the maximal metric value;

Step 303: Comparing the maximal metric value with threshold value. If said maximal metric value is larger than the threshold value, carry out step 304; if said maximal metric value is smaller than the threshold value, carry out step 305;

Step 304: Determining the codeword corresponding to said maximal metric value as the demodulation output;

Step 305: Determining discontinuously-sent DTX as the demodulation output.

For each codeword in said transmission codebook, calculate metric value, including:

Processing the received signal on all reception units of each said receiving branch and said codeword to obtain a temporary metric value corresponding to said receiving branch and said codeword.

Summing the temporary metric values corresponding to all said receiving branches and said codeword to obtain the metric value for said codeword.

Processing the received signal on all reception units of each said receiving branch and said codeword to obtain a temporary metric value corresponding to said receiving branch and said codeword, including:

Said codeword includes M elements, and said M refers to the number of reception units on said receiving branch;

Multiplying the conjugation of the $m^{th}$ ($1 \leq m \leq M$) element of said codeword by the received signal on the $m^{th}$ reception unit to obtain the demodulation value corresponding to the $m^{th}$ reception unit;

Summing said demodulation values corresponding to all reception units of said receiving branch, with the summation result taken as said temporary metric value corresponding to said receiving branch and said codeword;

wherein said codeword includes M elements and said M is number of reception units on said receiving branch.

processing the received signal on all reception units of each said receiving branch and a codeword to obtain a temporary metric value corresponding to said receiving branch and said codeword, including:

Said codeword includes M elements, and said M refers to the number of reception units on said receiving branch;

Multiplying the conjugation of the $m^{th}$ ($1 \leq m \leq M$) element of said codeword by the received signal on the $m^{th}$ reception unit to obtain the demodulation value corresponding to the $m^{th}$ reception unit;

Summing said demodulation values corresponding to all reception units of said receiving branch, with the square of the summation result taken as said temporary metric value corresponding to said receiving branch and said codeword;

wherein said codeword includes M elements and said M is number of reception units on said receiving branch.

Each of said receiving branches corresponds to a mutually orthogonal channel, which can be achieved by orthogonality in frequency domain, time domain, code division domain, spatial domain, or combinations thereof.

Each reception unit corresponds to one OFDM symbol or one SC-FDMA symbol.

Embodiment II

Embodiment II of the present invention provides a method for receiving signals, in which ACK/NAK is taken as an example 1 to specifically introduce the method for receiving signals provided in Embodiment I.

To simplify description, the following abbreviations are used in Embodiment II of the present invention:

i: transmission/reception instance index, i=0, 1, . . . , I
j: slot index, j=0, 1, . . . , J
k: receive antenna index, k=0, 1, . . . , K
m: channel index, m=0, 1, . . . , M s (i, j, m): transmission signal on transmission instance i, slot j and channel m.

y (i, j, m, k): transmission signal on reception instance i, slot j, channel m and receive antenna k.

s=[s(0, 0, 0), s(1, 0, 0), . . . , s(I, J, M)]: codeword of a transmission signal, including pilot symbol and data symbol transmitting useful information.

S: codeword of a transmission signal, including all possible s

δ: DTX detection threshold

Wherein, I, J, K and M refer to non-negative integers. Transmission/reception instance refers to transmission unit. In OFDM system, a transmission/reception instance can be an OFDM symbol. In SC-FDMA system, it can be a SC-FDMA symbol.

Demodulation algorithm of ACK/NAK is shown as below:
Calculate $$E = \max_{S} \left( \sum_{k=0}^{K} \sum_{j=0}^{J} \sum_{m=0}^{M} \left| \sum_{i=0}^{I} (y(i, j, m, k) \times s^*(i, j, m)) \right|^2 \right) \quad (1)$$

Calculate corresponding codeword $s_{opt}$ according to this formula. If E≤δ or E<δ, Determining DTX; otherwise, it refers to information bit corresponding to $s_{opt}$.

Main idea of the demodulation algorithm is as follows:

Received signal performs conjugate dot product with one possible codeword;

Perform coherent combining of the above signals after dot product on a slot, receive antenna and channel. Wherein, it's supposed that different transmission/reception instances on a slot, receive antenna and channel have similar channel condition.

Perform non-coherent combining of signals on different slots, receive antennae and channels after coherent combining to obtain the value relating to reception signal and said codeword. Wherein, it's supposed that channel condition is different on different slots, receive antennae and channels.

For each codeword, repeat the above operation to obtain corresponding relevant value.

Select the codeword $s_{opt}$ with maximum relevant value from all codewords and the corresponding relevant value E If E≤δ or E<δ, Determining DTX; otherwise, it refers to information bit corresponding to $s_{opt}$.

It shall be explained that any slight modification based on demodulation algorithm of the present invention shall be protected by the present invention. For example, the formula (1) can also be modified as shown below:

$$E = \max_{S} \left( \sum_{k=0}^{K} \sum_{j=0}^{J} \sum_{m=0}^{M} \left| \sum_{i=0}^{I} (y(i, j, m, k) \times s^*(i, j, m)) \right| \right), \text{ or}$$

$$E = \max_{S} \left( \sum_{k=0}^{K} \sum_{j=0}^{J} \left| \sum_{m=0}^{M} \sum_{i=0}^{I} (y(i, j, m, k) \times s^*(i, j, m)) \right|^2 \right), \text{ or}$$

$$E = \max_{S} \left( \sum_{k=0}^{K} \sum_{j=0}^{J} \left| \sum_{m=0}^{M} \sum_{i=0}^{I} y(i, j, m, k) \times s^*(i, j, m) \right| \right), \text{ or}$$

-continued $$E = \max_S \left( \sum_{k=0}^{K} \sum_{j=0}^{J} \left| \sum_{i=0}^{I} (y(i,j,m,k) \times s^*(i,j,m)) \right| \right),$$

wherein m corresponds to channel number of s (i, j, m)≠0

Embodiment III

This embodiment will introduce the transmission codebook and codeword included in embodiment I and embodiment II.

For ACK/NAK transmission mode based on 3GPP LTE/LTE-A, a slot has 7 SC-FDMA symbols (I=6), a subframe has 2 slots (J=1) and 1 channel (M=0). It can be (A,A), (A,N), (N,A) and (N,N) if two ACK/NAK bits are transmitted.

Codebook S includes codeword s1, s2, s3 and s4 as shown in Table 5.

TABLE 5

| | j = 0 | | | | | | | j = 1 | | | | | | |
|---|---|---|---|---|---|---|---|---|---|---|---|---|---|---|
| | i = 0 | i = 1 | i = 2 | i = 3 | I = 4 | i = 5 | i = 6 | i = 0 | i = 1 | i = 2 | i = 3 | i = 4 | i = 5 | i = 6 |
| s1 | 1 | 1 | 1 | 1 | 1 | 1 | 1 | 1 | 1 | 1 | 1 | 1 | 1 | 1 |
| s2 | j | j | 1 | 1 | 1 | j | j | j | j | 1 | 1 | 1 | j | j |
| s3 | −j | −j | 1 | 1 | 1 | −j | −j | −j | −j | 1 | 1 | 1 | −j | −j |
| s4 | −1 | −1 | 1 | 1 | 1 | −1 | −1 | −1 | −1 | 1 | 1 | 1 | −1 | −1 |

Embodiment IV

This embodiment will introduce the transmission codebook and codeword included in embodiment I and embodiment II.

For ACK/NAK transmission mode based on 3GPP LTE/LTE-A, a slot has 7 SC-FDMA symbols (I=6), a subframe has 2 slots (J=1) and 2 channels (M=1). It can be (A,A), (A,N), (N,A) and (N,N) if two ACK/NAK bits are transmitted. Codebook S includes codeword s1, s2, s3 and s4 as shown in Table 6.

TABLE 6

| m | j | I | s1 | s2 | s3 | s4 |
|---|---|---|---|---|---|---|
| 0 | 0 | 0 | 1 | −1 | 0 | 0 |
| | | 1 | 1 | −1 | 0 | 0 |
| | | 2 | 1 | 1 | 0 | 0 |
| | | 3 | 1 | 1 | 0 | 0 |
| | | 4 | 1 | 1 | 0 | 0 |
| | | 5 | 1 | −1 | 0 | 0 |
| | | 6 | 1 | −1 | 0 | 0 |
| | 1 | 0 | 1 | −1 | 0 | 0 |
| | | 1 | 1 | −1 | 0 | 0 |
| | | 2 | 1 | 1 | 0 | 0 |
| | | 3 | 1 | 1 | 0 | 0 |
| | | 4 | 1 | 1 | 0 | 0 |
| | | 5 | 1 | −1 | 0 | 0 |
| | | 6 | 1 | −1 | 0 | 0 |
| 1 | 0 | 0 | 0 | 0 | 1 | −1 |
| | | 1 | 0 | 0 | 1 | −1 |
| | | 2 | 0 | 0 | 1 | 1 |
| | | 3 | 0 | 0 | 1 | 1 |
| | | 4 | 0 | 0 | 1 | 1 |
| | | 5 | 0 | 0 | 1 | −1 |
| | | 6 | 0 | 0 | 1 | −1 |
| | 1 | 0 | 0 | 0 | 1 | −1 |
| | | 1 | 0 | 0 | 1 | −1 |
| | | 2 | 0 | 0 | 1 | 1 |
| | | 3 | 0 | 0 | 1 | 1 |
| | | 4 | 0 | 0 | 1 | 1 |
| | | 5 | 0 | 0 | 1 | −1 |
| | | 6 | 0 | 0 | 1 | −1 |

Perform joint demodulation of data symbol and pilot symbol through the method provided by the embodiments of the present invention to make the demodulation results more reliable; meanwhile; judge whether it is discontinuous transmission (DTX) based on joint demodulation of data symbol and pilot symbol.

Embodiment V

Figure 4:
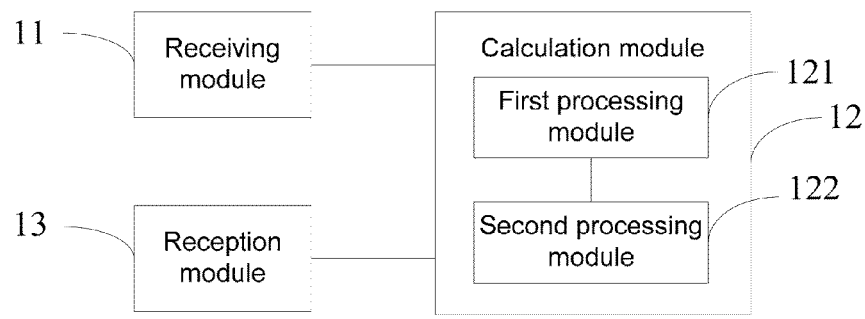
FIG. 4 is a structure diagram of the apparatus for receiving signals provided by Embodiment V of the present invention.

Based on the same technical consideration of the above method, Embodiment V of the present invention provides an apparatus for receiving signals as shown in FIG. 4, including:

Receiving module 11, which is used to receive signals on at least one receiving branch, which includes at least two reception units, including at least one data reception unit and at least one pilot reception unit, and said signal is a codeword in a transmission codebook;

Calculation module 12, which is used to calculate a metric value for each codeword in said transmission codebook according to said received signal and obtaining the maximal metric value;

Demodulation module 13, which is used determine the codeword corresponding to said maximal metric value as the demodulation output if said maximal metric value is larger than a threshold value, and determine discontinuous-transmission DTX as the demodulation output if said maximal metric value is smaller than a threshold value.

Said calculation module 12 includes:

The first processing module 121, which is used to process the received signal on all reception units of each said receiving branch and a codeword to obtain a temporary metric value corresponding to said receiving branch and said codeword;

The second processing module 121, which is used to sum the temporary metric values corresponding to all said receiving branches and said codeword to obtain the metric value for said codeword.

Said first processing module 121 is also used to:

Multiply the conjugation of the $m^{th}$ (1≤m≤M) element of said codeword by the received signal on the $m^{th}$ reception unit to obtain the demodulation value corresponding to the $m^{th}$ reception unit; Said codeword includes M elements, and said M refers to the number of reception units on said receiving branch;

Sum said demodulation values corresponding to all reception units of said receiving branch, with the summation result taken as said temporary metric value corresponding to said receiving branch and said codeword.

Said first processing module 121 is also used to:

Multiply the conjugation of the $m^{th}$ ($1 \le m \le M$) element of said codeword by the received signal on the $m^{th}$ reception unit to obtain the demodulation value corresponding to the $m^{th}$ reception unit; wherein said codeword includes M elements, and said M is number of reception units on said receiving branch;

Sum said demodulation values corresponding to all reception units of said receiving branch, with the square of the summation result taken as said temporary metric value corresponding to said receiving branch and said codeword.

Each said receiving branch corresponds to a mutually orthogonal channel, which can be achieved by orthogonality in frequency domain, time domain, code division domain, spatial domain, or combinations thereof.

Each reception unit corresponds to one OFDM symbol or one SC-FDMA symbol.

In the embodiments of the present invention, perform joint demodulation of data symbol and pilot symbol to make the demodulation results more reliable; meanwhile, judge whether it is discontinuous transmission (DTX) based on joint demodulation of data symbol and pilot symbol.

Through description of the above embodiments, technical personnel of the field can clearly understand that the present invention is realized depending on software and necessary general hardware platform, and also can be realized through hardware. However, the former is better in many cases. Based on this understanding, the technical solution of the present invention or the part making contributions to available technology can be essentially reflected by means of software product. This computer software product is stored in a storage medium, including several instructions to enable a computer unit (such as handset, personal computer, sever, or network equipment, etc.) to implement the methods described in all embodiments of the present invention.

Only the preferred embodiments of the present invention are mentioned above. It should be pointed out that technical personnel of the technical field can make any improvement and modification on the premise of respecting the invention principle, which also shall be protected by the present invention.

The invention claimed is:

1. A method for receiving signals, comprising:
   receiving signals on at least one receiving branch, which includes at least two reception units, including at least one data reception unit and at least one pilot reception unit, and said signal is a codeword in a transmission codebook;
   calculating a metric value for each codeword in said transmission codebook according to said received signal and obtaining the maximal metric value;
   determining the codeword corresponding to said maximal metric value as the demodulation output if said maximal metric value is larger than a threshold value; and
   determining discontinuous-transmission DTX as the demodulation output if said maximal metric value is smaller than a threshold value;
   wherein, calculating the metric value for each codeword in said transmission codebook comprises:
      processing the received signal on all reception units of each said receiving branch and a codeword to obtain a temporary metric value corresponding to said receiving branch and said codeword; and
      summing the temporary metric values corresponding to all said receiving branches and said codeword to obtain the metric value for said codeword.

2. The method of claim 1, wherein processing the received signal on all reception units of each said receiving branch and a codeword to obtain a temporary metric value corresponding to said receiving branch and said codeword comprises:
   multiplying the conjugation of the $m^{th}$ ($1 \le m \le M$) element of said codeword by the received signal on the $m^{th}$ reception unit to obtain the demodulation value corresponding to the $m^{th}$ reception unit; and
   summing said demodulation values corresponding to all reception units of said receiving branch, with the summation result taken as said temporary metric value corresponding to said receiving branch and said codeword;
   wherein said codeword includes M elements and said M is number of reception units on said receiving branch.

3. The method of claim 1, wherein processing the received signal on all reception units of each said receiving branch and a codeword to obtain a temporary metric value corresponding to said receiving branch and said codeword comprises:
   multiply the conjugation of the $m^{th}$ ($1 \le m \le M$) element of said codeword by the received signal on the $m^{th}$ reception unit to obtain the demodulation value corresponding to the $m^{th}$ reception unit; and
   summing said demodulation values corresponding to all reception units of said receiving branch, with the square of the summation result taken as said temporary metric value corresponding to said receiving branch and said codeword;
   wherein said codeword includes M elements and said M is number of reception units on said receiving branch.

4. The method of claim 1, wherein each said receiving branch corresponds to a mutually orthogonal channel, which can be achieved by orthogonality in frequency domain, time domain, code division domain, spatial domain, or combinations thereof.

5. The method of claim 1, wherein each reception unit corresponds to one orthogonal frequency division multiplexing (OFDM) symbol or one single carrier frequency division multiple access (SC-FDMA) symbol.

6. An apparatus for receiving signals, comprising:
   a receiving module used to receive signals on at least one receiving branch, which includes at least two reception units, including at least one data reception unit and at least one pilot reception unit, and said signal is a codeword in a transmission codebook;
   a calculation module used to calculate a metric value for each codeword in said transmission codebook according to said received signal and obtaining the maximal metric value; and
   a demodulation module used to determine the codeword corresponding to said maximal metric value as the demodulation output if said maximal metric value is larger than a threshold value, and determine discontinuous-transmission DTX as the demodulation output if said maximal metric value is smaller than a threshold value;
   wherein, the calculation module comprises:
      a first processing unit, used to process the received signal on all reception units of each said receiving branch and a codeword to obtain a temporary metric value corresponding to said receiving branch and said codeword; and
      a second processing unit, used to sum the temporary metric values corresponding to all said receiving branches and said codeword to obtain the metric value for said codeword.

7. The apparatus of claim 6, wherein said first processing module is also used to:

multiply the conjugation of the $m^{th}$ ($1 \leq m \leq M$) element of said codeword by the received signal on the $m^{th}$ reception unit to obtain the demodulation value corresponding to the $m^{th}$ reception unit, wherein said codeword includes M elements and said M is number of reception units on said receiving branch; and sum said demodulation values corresponding to all reception units of said receiving branch, with the summation result taken as said temporary metric value corresponding to said receiving branch and said codeword.

8. The apparatus of claim 6, wherein said first processing module is also used to:

multiply the conjugation of the $m^{th}$ ($1 \leq m \leq M$) element of said codeword by the received signal on the $m^{th}$ reception unit to obtain the demodulation value corresponding to the $m^{th}$ reception unit, wherein said codeword includes M elements and said M is number of reception units on said receiving branch; and sum said demodulation values corresponding to all reception units of said receiving branch, with the square of the summation result taken as said temporary metric value corresponding to said receiving branch and said codeword.

9. The apparatus of claim 6, wherein each said receiving branch corresponds to a mutually orthogonal channel, which can be achieved by orthogonality in frequency domain, time domain, code division domain, spatial domain, or combinations thereof.

10. The apparatus of claim 6, wherein each reception unit corresponds to one orthogonal frequency division multiplexing (OFDM) symbol or one single carrier frequency division multiple access (SC-FDMA) symbol.

* * * * *